United States Patent
Seo et al.

(10) Patent No.: US 9,916,925 B2
(45) Date of Patent: *Mar. 13, 2018

(54) WIRELESS POWER RECEIVER AND TRANSFER, WIRELESS POWER TRANSCEIVER SYSTEM, AND WIRELESS POWER TRANSCEIVER MOBILE DEVICE

(71) Applicant: Soongsil University-Industry Cooperation Foundation, Seoul (KR)

(72) Inventors: Chul Hun Seo, Seoul (KR); Chongmin Lee, Seoul (KR)

(73) Assignee: SOONGSIL UNIVERSITY-INDUSTRY COOPERATION FOUNDATION, Seoul (KR)

( * ) Notice: Subject to any disclaimer, the term of this patent is extended or adjusted under 35 U.S.C. 154(b) by 1156 days.

This patent is subject to a terminal disclaimer.

(21) Appl. No.: 13/974,344

(22) Filed: Aug. 23, 2013

(65) Prior Publication Data
US 2014/0062215 A1 Mar. 6, 2014

(30) Foreign Application Priority Data
Aug. 31, 2012 (KR) .................. 10-2012-0096207

(51) Int. Cl.
*H02J 50/12* (2016.01)
*H02J 50/80* (2016.01)
(Continued)

(52) U.S. Cl.
CPC ......... *H01F 38/14* (2013.01); *H01F 27/2804* (2013.01); *H01Q 7/00* (2013.01);
(Continued)

(58) Field of Classification Search
CPC .............. H01Q 15/0086; H01Q 7/00; H04B 5/0025–5/0093; B60L 11/182;
(Continued)

(56) References Cited

U.S. PATENT DOCUMENTS

| 8,040,586 B2 * | 10/2011 | Smith | B82Y 20/00 330/4.9 |
| 2010/0171667 A1 * | 7/2010 | Knudsen | H01Q 1/243 343/702 |

(Continued)

FOREIGN PATENT DOCUMENTS

KR   10-2011-0121450   11/2011

OTHER PUBLICATIONS

Jan Machac, A Double H-Shaped Resonator for an Isotropic ENG Metamaterial Jan. 19, 2009, 38th European Microwave Conference, 547-550.*

Yuandan Dong et al., "Promising Future of Metamaterials", IEEE Microwave Magazine, vol. 13, Mar./Apr. 2012.

(Continued)

*Primary Examiner* — Rexford Barnie
*Assistant Examiner* — Thai Tran
(74) *Attorney, Agent, or Firm* — Bacon & Thomas, PLLC

(57) ABSTRACT

A wireless power receiver includes a receiver resonator configured to be coupled to a source resonator to receive a power from the source resonator, the receiver resonator comprising: a planar dielectric layer; an antenna patterned in the form of a loop on the dielectric layer or arranged in the shape of a ring in the exterior of the dielectric layer; and a meta-structure separated from the antenna and arranged on the dielectric layer within the antenna, wherein the meta-structure is configured to reinforce at least one of the electric fields and magnetic fields that are formed in the receiver resonator.

13 Claims, 11 Drawing Sheets

(51) Int. Cl.
*H01F 38/14* (2006.01)
*H02J 7/02* (2016.01)
*H01F 27/28* (2006.01)
*H01Q 7/00* (2006.01)
*H01Q 15/00* (2006.01)
*H02J 17/00* (2006.01)

(52) U.S. Cl.
CPC ......... *H01Q 15/0086* (2013.01); *H02J 7/025* (2013.01); *H02J 17/00* (2013.01); *H02J 50/12* (2016.02); *H02J 50/80* (2016.02)

(58) Field of Classification Search
CPC .. B60L 11/1829–11/1831; H01F 38/14; H01F 27/2804; H01F 2038/143–2038/146; H02J 17/00; H02J 5/005; H02J 7/025; Y02T 90/122; A61N 1/3787; A61B 1/00029
USPC .......................................... 307/104; 320/108
See application file for complete search history.

(56) References Cited

U.S. PATENT DOCUMENTS

| | | | |
|---|---|---|---|
| 2011/0133568 A1* | 6/2011 | Wang | H02J 17/00 307/104 |
| 2011/0193415 A1* | 8/2011 | Choi | H02J 5/005 307/104 |
| 2011/0267247 A1 | 11/2011 | Choi et al. | |
| 2012/0280872 A1* | 11/2012 | Werner | H01Q 15/0053 343/753 |
| 2014/0042971 A1* | 2/2014 | Seo | H02J 17/00 320/114 |

OTHER PUBLICATIONS

Christophe Caloz et al., "Electromagnetic Metamaterials: Transmission Line Theory and Microwave Applications".

Tatsuo Itoh et al., "Invited paper:Prospects for metamaterials", Electronics Letters, vol. 40, No. 16, Aug. 5, 2004.

* cited by examiner

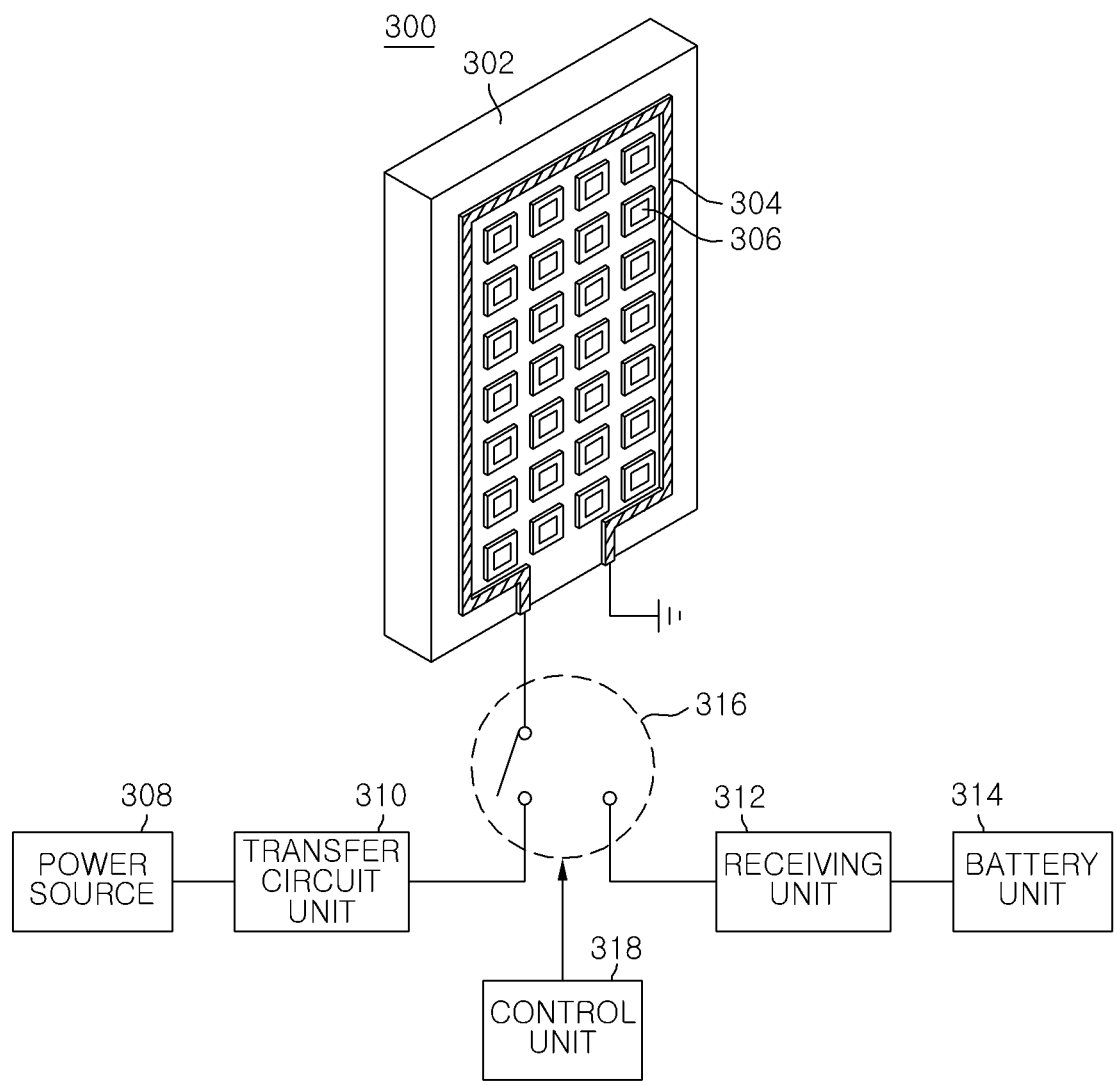

WIRELESS POWER RECEIVER AND TRANSFER, WIRELESS POWER TRANSCEIVER SYSTEM, AND WIRELESS POWER TRANSCEIVER MOBILE DEVICE

RELATED APPLICATIONS

This application claims the benefit of Korean Patent Application No. 10-2012-0096207, filed on Aug. 31, 2012, which is hereby incorporated by reference as if fully set forth herein.

FIELD OF THE INVENTION

The present invention relates to a wireless power transceiver technology, and, more particularly, to a wireless power receiver and transfer, wireless power transceiver system, and wireless power mobile device adapted to raise wireless power transceiver efficiency.

BACKGROUND OF THE INVENTION

The rapid development of wireless communication technologies enables a new challenge to the application fields looked possible in virtual reality, and hence many of the application fields have been implemented and realized immediately accordingly.

Among others, most notable fields are U-City using USN (Ubiquitous Sensor Network), Femtocells that enable home networks, Robots that play the role of home helpers, unmanned aircraft that carry out emergency missions during the war operations, space solar generation that can be solved the energy of the future and the environmental issues, etc. In such application fields, information collected in each field is used to permit recognition, prevention and control of various matters.

However, the systems applied to these application fields have a capability of performing wireless communications, but they have still manifested the problem in terms of the energy supply and transfer. So, it cannot be said that the systems are a wireless system or a wireless communication system in the true sense. In addition, these systems have an extremely dominant problem in the life of the battery and fuel, an amount of energy that can be transferred in a wireless manner.

In addition, the electric toothbrushes, notebooks, Walkman, and the like have been adopted an inductance coupling technique by electromagnetic waves so-called an electromagnetic induction method. However, the inductance coupling technique by electromagnetic waves has a drawback that energy transfer efficiency deteriorates rapidly if the coupling coefficient of inductors is not high and hence wireless energy transfer is not possible when leaving a specific location.

Thus, in order to solve the problems such as low power, transfer distance, an amount of energy that can be transferred, lasting operational time, and the like, there has been developing magnetic resonance techniques that are similar to the electromagnetic induction method but are designed to concentrate the energy at a specific resonance frequency through the use of inductors and capacitors to transfer power in the form of magnetic energy.

In a wireless energy transfer structure using such magnetic resonance techniques has a merit that it can transfer the energy with relatively high power to several meters compared to the electromagnetic induction method. Nevertheless, it requires a high resonance characteristic, i.e., high quality factor.

On the other hand, meta-materials collectively refer to substances that are artificially synthesized to exhibit distinct electromagnetic properties that are not common in nature.

The radio waves in most materials are propagated in compliance with the right-hand rule of the vector fields E, H, and $\beta$, where E is an electric field, H is a magnetic field and $\beta$ is a wave vector. The direction of the phase velocity is the same as the direction of energy signal propagation (group velocity), and the refractive index is a positive number. The material having the above properties refers to as a Right Handed (RH) material. Most natural materials are RH materials. Artifacts are also the RH materials.

The meta-material has an artificial structure. When the meta-material is designed a structural average unit cell size 'p' much smaller than the wavelength of electromagnetic energy that is guided by the meta-material, the meta-material can behavior like as a homogeneous medium with respect to the electromagnetic energy being guided. Unlike the RH material, the meta-material may represent a negative refractive index in which the relative direction of the vector fields (E, H, $\beta$) becomes opposite to the direction of the energy propagation and phase velocity of signals that comply with the left-hand rule. The meta-material that supports only the negative refractive index is a Left Handed (LH) meta-material.

Many of the meta-materials are a mixture of the LH meta-materials and RH meta-materials and therefore, are a Composite Right and Left Handed (CRLH) meta-materials. A CRLH meta-material may exhibit a property of an RH meta-material at a high frequency and a property of an LH meta-material at the low-frequency. The design and attribute for the CRLH meta-materials are disclosed by Christophe Caloz and Tatsuo Itoh, "Electromagnetic Metamaterial: Transmission Line Theory and microwave applications" John Wiley & Sons, 2006. The CRLH meta-materials and their applications in antennas are disclosed by Tatsuo Itoh, "invited paper: Prospects for Metamaterials", E-Journal, Volume 40, No. 16, August 2004. Both of which are hereby incorporated by reference as if fully set forth herein.

The CRLH meta-materials may be organized and processed to represent the electromagnetic attributes, which are produced for special purposes, to use in applications where it is difficult or impractical or impossible to use other materials. Further, the CRLH meta-materials may also be used to develop new applications and organize new elements that are not possible with the RH meta-materials.

The applicant focused on the fact that the appliance of the wireless power transfer technology to meta-materials may lead to an improvement of the wireless power transfer efficiency. Of course, there exist some technologies in which the wireless power transfer technology is adopted to meta-materials, but it is hard for these technologies to enhance sufficiently the fields of electric and magnetic fields by raising the resonance characteristics of the wireless power resonator.

SUMMARY OF THE INVENTION

In view of the above, the present invention provides a wireless power transceiver technique capable of improving the Q factor of a wireless power transceiver to reinforce electric fields or magnetic fields, for example, amplify or focus the fields.

Further, the present invention provides a wireless power transceiver technique capable of securing wireless power transfer efficiency of at least 80% in a specific radio frequency band, for example, a 13.56 MHz frequency band used for an NFC (Near Field Communication) technique.

Further, the present invention provides a wireless power transceiver technique capable of implementing a size reduction of a wireless power transceiver mobile device.

In accordance with an embodiment of the present invention, there is provided a wireless power receiver, which includes: a receiver resonator configured to be coupled to a source resonator to receive a power from the source resonator, the receiver resonator comprising: a planar dielectric layer; an antenna patterned in the form of a loop on the dielectric layer or arranged in the shape of a ring in the exterior of the dielectric layer; and a meta-structure separated from the antenna and arranged on the dielectric layer within the antenna, wherein the meta-structure is configured to reinforce at least one of the electric fields and magnetic fields that are formed in the receiver resonator.

In the exemplary embodiment, wherein the meta-structure includes at least one meta-pattern layer.

In the exemplary embodiment, wherein the meta-structure has an effective dielectric constant of a positive value and an effective permeability of a negative value, and wherein the frequency band absorbed by the meta-structure is different from the resonant frequency.

In the exemplary embodiment, wherein the meta-structure comprises a plurality of unit cells with a DHMR (Double H-shape Meta-material Resonator) structure.

In the exemplary embodiment, wherein the meta-structure has an effective dielectric constant and an effective permeability that are a negative value.

In the exemplary embodiment, wherein the dielectric layer comprises a plurality of dipole structures formed on the rear surface of the planar dielectric layer.

In the exemplary embodiment, wherein the meta-structure has a Q factor of 100.

In accordance with another embodiment of the present invention, there is provided a wireless power receiver, which includes: a receiver resonator configured to be coupled to a source resonator to receive a power from the source resonator, the receiver resonator comprising: a first planar dielectric layer; an antenna patterned in the form of a loop on the first dielectric layer or arranged in the shape of a ring in the exterior of the first dielectric layer; a first meta-structure arranged on the first dielectric layer within the antenna and configured to reinforce at least one of the electric fields and magnetic fields that are formed in the receiver resonator; a second planar dielectric layer located in the exterior of the first dielectric layer; and a second meta-structure arranged on the second dielectric layer and configured to reinforce at least one of the electric fields and magnetic fields that are formed in the receiver resonator.

In the exemplary embodiment, wherein the second meta-structure is arranged on the same plane as the first meta-structure.

In the exemplary embodiment, wherein the second meta-structure is configured to amplify any one of the electric fields and the magnetic fields that are formed in the receiver resonator.

In the exemplary embodiment, wherein the second meta-structure is perpendicular to the first meta-structure.

In the exemplary embodiment, wherein the second meta-structure is configured to focus any one of the electric fields and the magnetic fields that are formed in the receiver resonator.

In accordance with another embodiment of the present invention, there is provided a wireless power transfer, which includes: a source resonator configured to be coupled to a power supply, the source resonator comprising: a planar dielectric layer; an antenna configured patterned in the form of a loop on the dielectric layer; and a meta-structure arranged within the antenna and configured to reinforce at least one of the electric fields and magnetic fields that are formed in the receiver resonator.

In accordance with another embodiment of the present invention, there is provided a wireless power transceiver device, which includes: a resonator configured to be coupled to a power supply or a resonator of an external device to transfer and receive to and from the external device, the resonator comprising: a planar dielectric layer; an antenna patterned in the form of a loop on the dielectric layer; and a meta-structure arranged within the antenna and configured to reinforce at least one of the electric fields and magnetic fields that are formed in the receiver resonator.

In the exemplary embodiment, wherein the meta-structure is physically separated from the antenna and is patterned on the dielectric layer.

In the exemplary embodiment, wherein the meta-structure comprises one or more meta-pattern layers.

In the exemplary embodiment, wherein the meta-structure has an effective dielectric constant of a positive value and an effective permeability of a negative value, and wherein the frequency band absorbed by the meta-structure is different from the resonant frequency patterned on the dielectric layer.

In the exemplary embodiment, wherein the meta-structure comprises a plurality of unit cells with a DHMR (Double H-shape Meta-material Resonator) structure.

In the exemplary embodiment, wherein the meta-structure has an effective dielectric constant and an effective permeability that are a negative value.

In the exemplary embodiment, wherein the dielectric layer comprises a dipole structure of meta-materials, which corresponds to the unit cells, formed on the rear surface of the planar dielectric layer.

In the exemplary embodiment, wherein the meta-structure has a Q factor of 100.

As mentioned above, in accordance with an embodiment of the present invention, it is possible to reinforce the electric fields or magnetic fields through the improvement of the Q factor of the wireless power transceiver and secure the wireless power transfer efficiency of at least 80% in a 13.56 MHz frequency band used for the NFC. In addition, it is also possible to reduce the size of the wireless power transceiver mobile device while securing enough the wireless power transfer efficiency.

BRIEF DESCRIPTION OF THE DRAWINGS

The above and other objects and features of the present invention will become apparent from the following description of the embodiments given in conjunction with the accompanying drawings, in which:

FIG. 17 illustrates an overall configuration diagram of a wireless power transceiver mobile device in accordance with an embodiment of the present invention.

DETAILED DESCRIPTION OF THE EMBODIMENTS

The advantages and features of exemplary embodiments of the present invention and methods of accomplishing them will be clearly understood from the following description of the embodiments taken in conjunction with the accompanying drawings. However, the present invention is not limited to those embodiments and may be implemented in various forms. It should be noted that the embodiments are provided to make a full disclosure and also to allow those skilled in the art to know the full scope of the present invention. Therefore, the present invention will be defined only by the scope of the appended claims.

In the following description, well-known functions or constitutions will not be described in detail if they would unnecessarily obscure the embodiments of the invention. Further, the terminologies to be described below are defined in consideration of functions in the invention and may vary depending on a user's or operator's intention or practice. Accordingly, the definition may be made on a basis of the content throughout the specification.

Before describing the embodiment of the present invention, it is noted that the embodiment invention applies the meta-structure to the technology of the wireless power transceiver and provides a technique of reinforcing the electric fields or magnetic fields through the improvement of the Q factor of the wireless power transceiver, securing the wireless power transfer efficiency of at least 80% in a 13.56 MHz frequency band used for the NFC, and achieving the size reduction of a wireless power transceiver mobile device, whereby the object of the present invention will be achieved easily from the technical idea.

Figure 1:
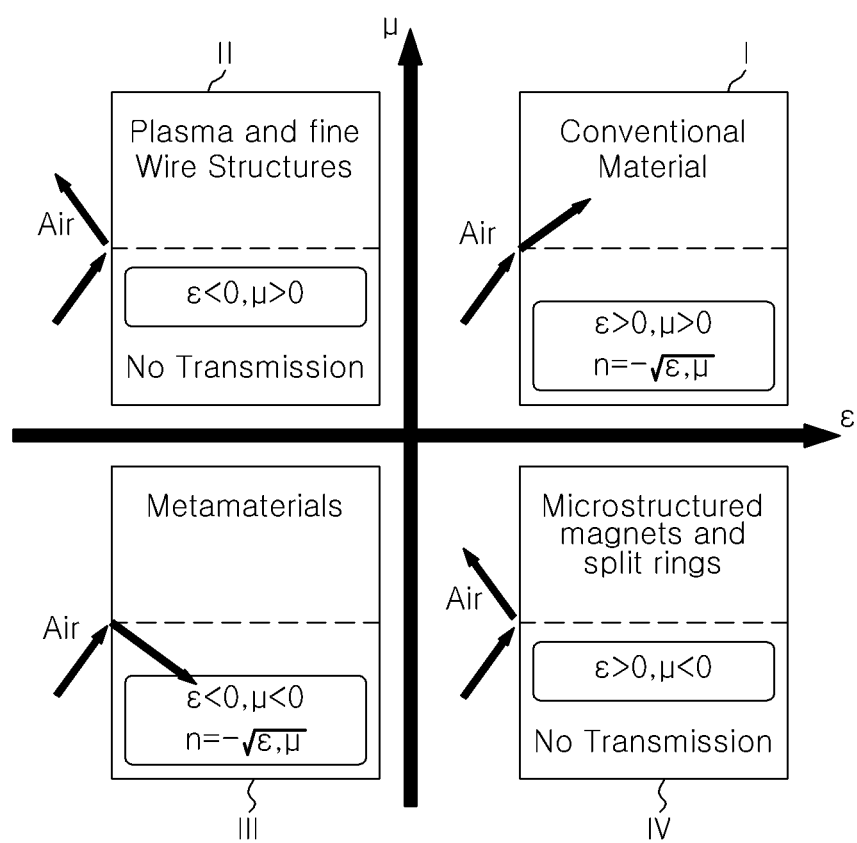
FIG. 1 is a diagram explaining a property of a meta-structure applied to an embodiment of the present invention.

First, in terms of the meta-electromagnetic wave structure applied to the embodiments of the present invention, as shown in FIG. 1, most materials in the natural world are present in a first quadrant I and have positive values in both effective dielectric constant and effective permeability that show the properties of the materials. In a case where a radio wave is incident on a material present in one quadrant, the radio wave refracts and proceeds in compliance with the Snell's law.

For materials that are present in a second quadrant II, an effective dielectric constant has a negative value while the effective permeability has a positive value. These materials have a property that a radio wave incident on these materials is absorbed and vanished in accordance with the absorption the traveling distance of the radio wave without proceeding further.

Materials present in a third quadrant III have a property that both an effective dielectric constant and an effective permeability have a negative value. Further, a radio wave incident on these materials transmits at a particular frequency band, but it proceeds with a 180° phase difference between phase velocity and group velocity. Further, the materials exhibit that the radio wave is absorbed at the other frequency bands with the exception of the particular frequency band or vanished depending on the travelling distance of the radio wave.

For materials that are present in a fourth quadrant IV, an effective dielectric constant has a positive value while an effective permeability has a negative value. The materials typically include ferrites, etc. and have properties that a radio wave incident on these materials is transmitted and absorbed without further propagation or vanished depending on the traveling distance of the radio wave. Therefore, it is possible to design a material to get the same property of the materials present in the first, second, third and fourth quadrants in a specific frequency band. This is just such characteristic of the material, but is not such a material per se.

The meta-structure that is proposed in the embodiments of the present invention is intended to mean a structure designed to have a meta-radio wave property.

Hereinafter, the embodiments of the present invention will be described in detail with reference to the accompanying drawings.

Figure 2:
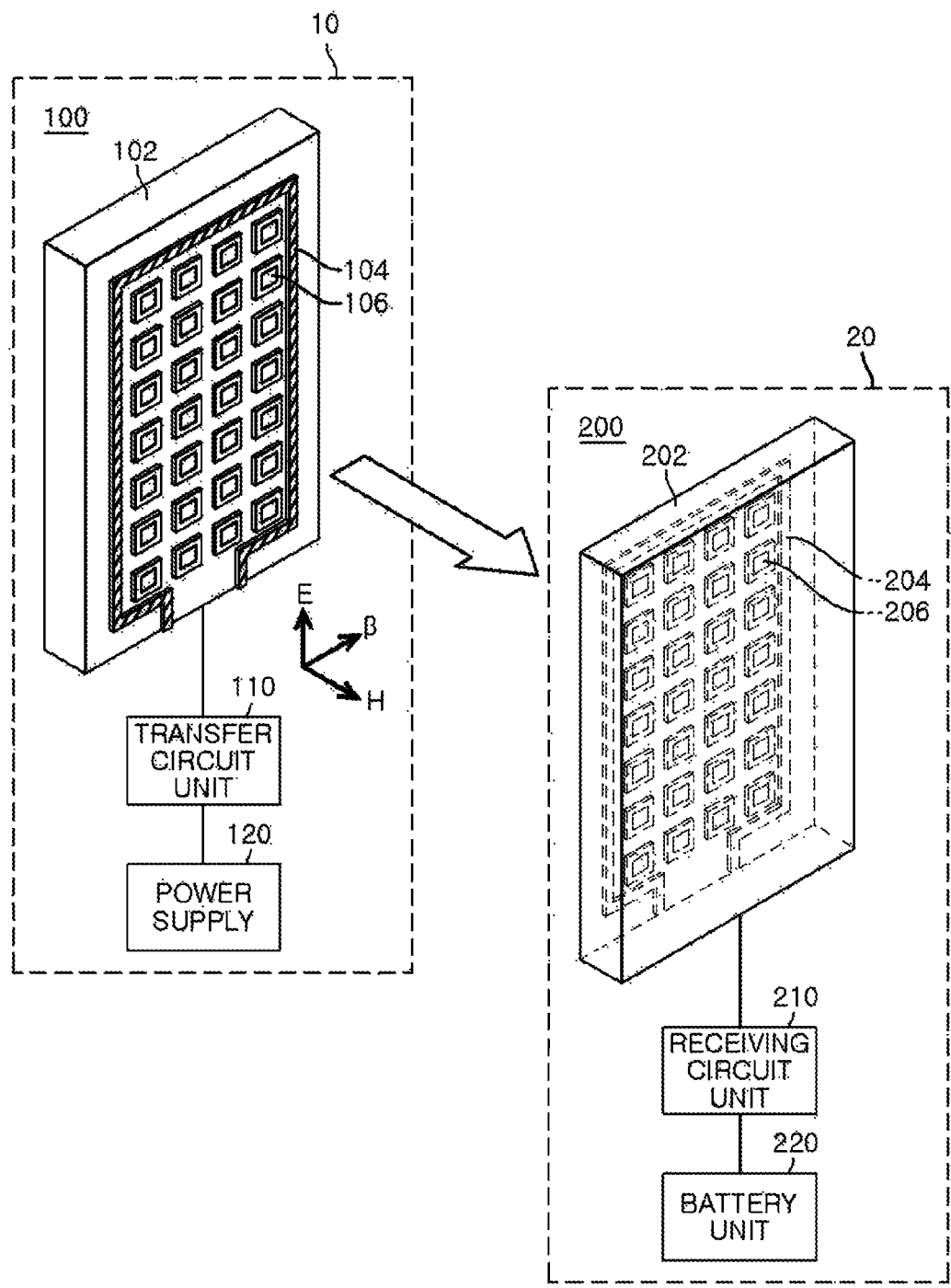
FIG. 2 is an overall configuration diagram of a wireless power transceiver system in accordance with an embodiment of the present invention.

FIG. 2 is an overall configuration diagram of a wireless power transceiver system in accordance with an embodiment of the present invention.

As illustrated in FIG. 2, the wireless power transceiver system generally includes a wireless power transfer 10 and a wireless power receiver 20. The wireless power transfer 10 is composed of a source resonator 100, a transfer circuit unit 110, and a power supply 120. The wireless power receiver 20 is composed of a receiver resonator 200, a receiver circuit unit 210, and a battery unit 220.

The source resonator 100, which may be coupled to a power supply (not shown), includes a planar dielectric layer 102, a loop-shaped antenna 104 patterned on the planar dielectric layer, and a meta-structure 106 that is arranged within the antenna 104 and is configured to reinforce at least one of electric fields and magnetic fields that are formed in the source resonator 100.

The meta-structure 106, which is applied to the embodiment of the present invention, is physically separated from the antenna 104. The meta-structure 106 may include one or more meta-pattern layers patterned on the dielectric layer 102, e.g., an array of unit cells with a DHMR (Double H-shape Meta-material Resonator) structure. In this example, it is characterized in that the meta-structure 106 has a Q factor of 100.

Such a meta-structure 106 has an effective dielectric constant $\in$ of a positive value and an effective permeability $\mu$ of a negative value, and in this condition, it is characterized in that the frequency band absorbed by the meta-structure 106 is different from the resonant frequency.

Additionally and alternatively, the meta-structure 106 has an effective dielectric constant $\in$ and an effective permeability $\mu$ that are a negative value, and in this condition, it is characterized in that an array of dipole structures (not shown) are arranged on the rear surface of the planar dielectric layer 102 as similar as an array of unit cells.

The transfer circuit unit 110 may include a VCO (Voltage Controlled Oscillator) (not shown) that changes a DC controlled voltage from a power supply to control an output oscillation frequency and an amplifier (not shown) that amplifies an AC signal controlled through the use of the VCO.

The amplifier includes, for example, an adaptive bias circuit, which in turn receives information on a charge state from the receiver resonator 200 to stop charging the power.

The power supply 120 feeds a power to the wireless power transfer 10.

In FIG. 2, a direction 'E' around the source resonator 100 represents a direction of the electric fields; a direction 'H' represents the magnetic fields; and a direction 'β' represents a wave vector.

Meanwhile, the receiver resonator 200 is coupled to the source resonator 100 to receive the power from the source resonator 100. The receiver resonator 200 includes a planar dielectric layer 202, a loop-shaped antenna 204 patterned on the planar dielectric layer, and the meta-structure 206 that is arranged within the loop, i.e., the antenna 204 and is configured to reinforce at least one of the electric fields and magnetic fields that are formed in the receiver resonator 200.

The meta-structure 206, which is applied to the embodiment of the present invention, is physically separated from the antenna 204, and may include one or more meta-pattern layers patterned on the dielectric layer 202, e.g., an array of unit cells with a DHMR (Double H-shape Meta-material Resonator) structure. In this example, it is characterized in that the meta-structure 206 has a Q factor of 100.

Such a meta-structure 206 has an effective dielectric constant $\in$ of a positive value and an effective permeability $\mu$ of a negative value, and in this condition, it is characterized in that the frequency band absorbed by the meta-structure 206 is different from the resonant frequency.

Additionally and alternatively, the meta-structure 206 has an effective dielectric constant $\in$ and an effective permeability $\mu$, which are negative values, and in this condition, it is characterized in that a dipole structure of meta-materials (not shown) corresponding to the array of the unit cells are formed on the rear surface of the planar dielectric layer the planar dielectric layer 202.

The receiver circuit unit 210 may include a rectifier (not shown) that rectifies the power received through the receiver resonator 200 and a DC-DC converter (not shown) that converts an input of a rectified DC voltage from the rectifier into a DC voltage.

The battery unit 220 serves to charge the power converted through the DC-DC converter.

Continued referring to FIG. 2, the wireless power receiver 20 is adapted to monitor its own charge state and delivery the charge state information to the source resonator 100. The charge state information may be forwarded, for example, using a near field communication such as a Bluetooth technique.

Further, the wireless power receiver 20 is adapted to stop receiving the power from the source resonator 100 in accordance with the charge state of the receiver resonator 200. To accomplish it, any additional controller may be furnished in the wireless power receiver 20.

In the wireless power transceiver system provided with the wireless power transfer 10 and the wireless power receiver 20, the meta-structure is applied to both the source resonator 100 and the receiver resonator 200, which results in improving a Q factor of the wireless power transceiver apparatus to reinforce the electric fields or the magnetic fields, securing a wireless power transfer efficiency of 80%, and reducing the size of the wireless power transceiver system.

Figure 3:
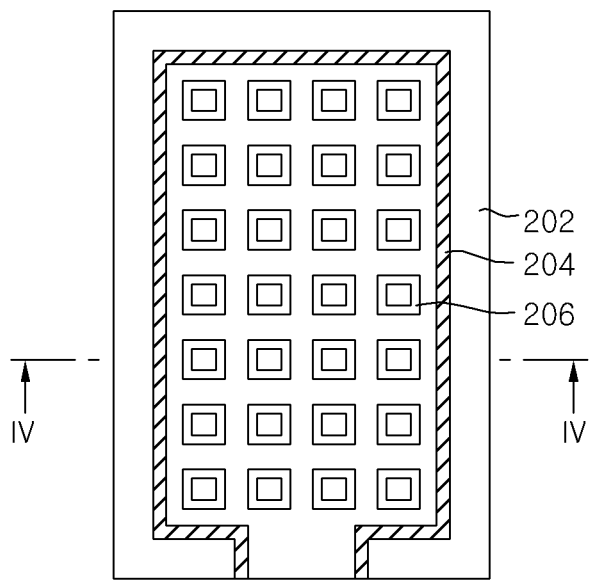
FIG. 3 show a plan view of an example of a receiver resonator (or a source resonator) applied to a wireless power receiver (or a wireless power transfer) in accordance with an embodiment of the present invention.
Figure 4:
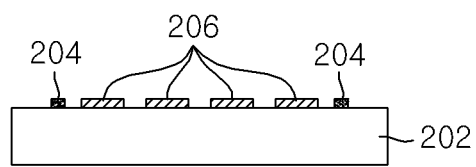
FIG. 4 is a sectional view of the receiver resonator (or the source resonator) shown in FIG. 3 taken along a line IV-IV.

FIG. 3 is a plan view of the receiver resonator 200 applied to the wireless power receiver 20 in accordance with an embodiment of the present invention, and FIG. 4 is a sectional view of the receiver resonator of FIG. 3 taken along a line IV-IV.

As illustrated in FIGS. 3 and 4, the antenna 204 is formed in the form of a loop along the edge of a front surface of the dielectric layer 202. In addition, the meta-structure 206 is formed on the front surface of the dielectric layer 202 within the antenna 204.

While only the receiver resonator 200 of the wireless power receiver 20 is depicted in FIGS. 3 and 4 for the sake of explanation, it will be readily appreciated to those having an ordinary skill in the art that the same dielectric layer, meta-structure and others as illustrated in FIGS. 3 and 4 may also be applied to the source resonator 100 of the wireless power transfer 10.

Figure 5:
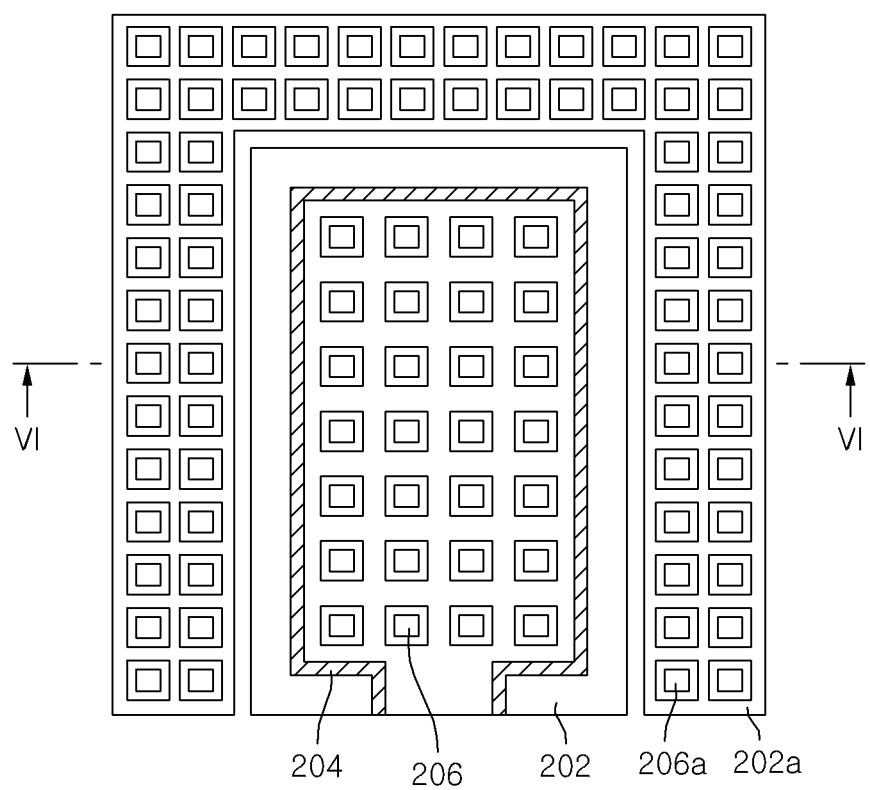
FIG. 5 shows a plan view of another example of a receiver resonator (or a source resonator) applied to a wireless power receiver (or a wireless power transfer) in accordance with an embodiment of the present invention, wherein the first and second meta-structures are located on the same plane.
Figure 6:
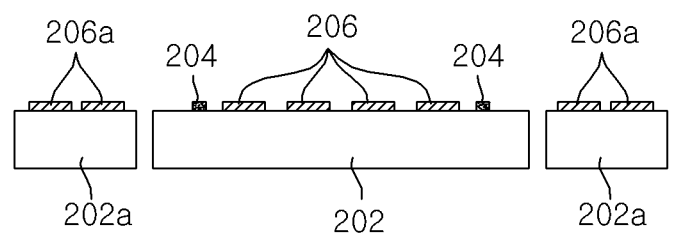
FIG. 6 is a sectional view of the receiver resonator (or the source resonator) shown in FIG. 5 taken along a line VI-VI.

FIG. 5 is a plan view of another example of the receiver resonator 200 applied to the wireless power receiver 20 in accordance with an embodiment of the present invention, and FIG. 6 is a sectional view of the receiver resonator 200 of FIG. 5 taken along a line VI-VI.

The receiver resonator 200 as illustrated in FIG. 5 includes a first planar dielectric layer 202, a loop-shaped antenna 204 patterned on the first dielectric layer 202, a first meta-structure 206 that is arranged within the antenna 204 and reinforces at least one of the electric fields and magnetic fields that are formed in the receiver resonator 200. The receiver resonator 200 also includes a second planar dielectric layer 202a located in the exterior of the first dielectric layer 202 while enclosing the first dielectric layer 202 and a second meta-structure 206a that is arranged on the second dielectric layer 202a and reinforces at least one of the electric fields and magnetic fields that are formed in the receiver resonator 200.

In this example, it is characterized in that the first and second meta-structures 206 and 206a are located on the same plane and the second meta-structure 206a amplifies any one of the electric fields and the magnetic fields that are formed in the receiver resonator 200.

While only the receiver resonator 200 of the wireless power receiver 20 is depicted in FIGS. 5 and 6 for the sake of explanation, it will be readily appreciated to those having an ordinary skill in the art that the same dielectric layers, meta-structures and others as illustrated in FIGS. 5 and 6 may also be applied to the source resonator 100 of the wireless power transfer 10.

Figure 7:
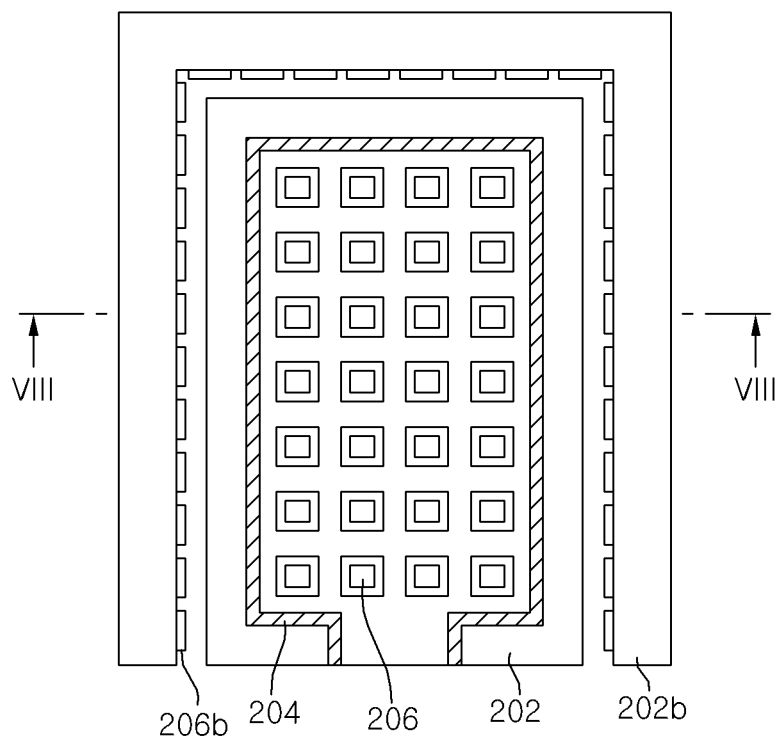
FIG. 7 shows a plan view of further another example of a receiver resonator (or a source resonator) applied to a wireless power receiver (or a wireless power transfer) in accordance with an embodiment of the present invention, wherein the first and second meta-structures are perpendicular to each other.
Figure 8:
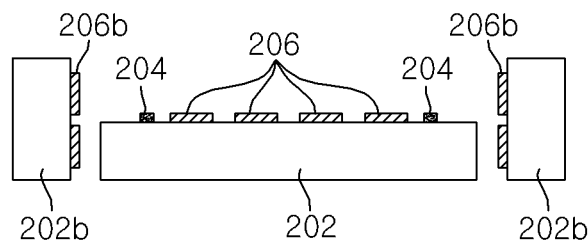
FIG. 8 is a sectional view of the receiver resonator (or the source resonator) shown in FIG. 7 taken along a line VIII-VIII.

FIG. 7 is a plan view of another example of the receiver resonator 200 applied to the wireless power receiver 20 in accordance with an embodiment of the present invention; FIG. 8 is a sectional view of the receiver resonator 200 of FIG. 7 taken along a line VIII-VIII; and FIG. 9 is a perspective view of the receiver resonator 200 of FIG. 7.

The receiver resonator 200 as illustrated in FIG. 7 includes a first planar dielectric layer 202, a loop-shaped antenna 204 patterned on the first dielectric layer 202, a first meta-structure 206 that is arranged within the antenna 204 and reinforces at least one of the electric fields and magnetic fields that are formed in the receiver resonator 200. The receiver resonator 200 also includes a second planar dielectric layer 202b arranged perpendicularly in the exterior of the first dielectric layer 202 while enclosing the first dielectric layer 202 and a second meta-structure 206b that is arranged on the second dielectric layer 202b and reinforces at least one of the electric fields and magnetic fields that are formed in the receiver resonator 200.

In this example, it is characterized in that the first and second meta-structures 206 and 206b are perpendicular to each other and the second meta-structure 206b focuses any one of the electric fields and the magnetic fields that formed in the receiver resonator 200.

Figure 9:
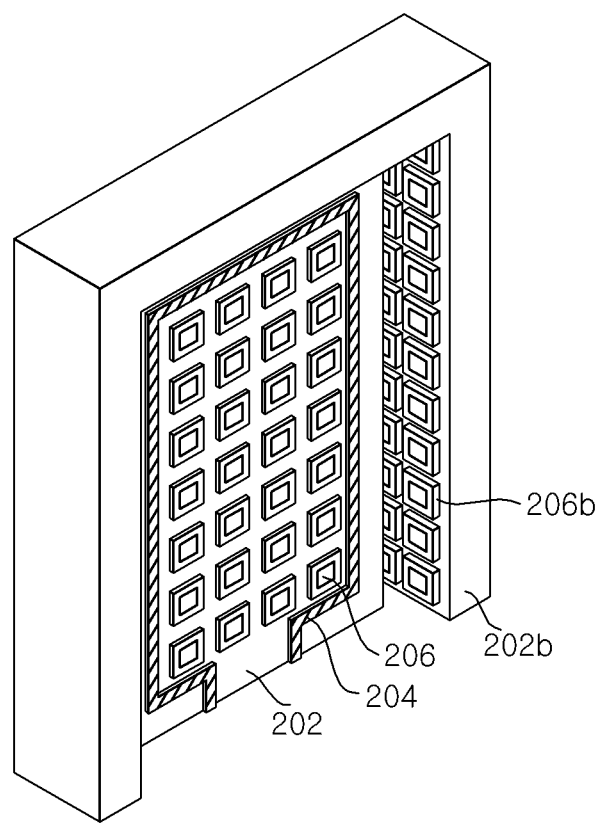
FIG. 9 is a perspective view of the receiver resonator (or the source resonator) shown in FIG. 7.

While only the receiver resonator 200 of the wireless power receiver 20 is depicted in FIGS. 7 to 9 for the sake of explanation, it will be readily appreciated to those having an ordinary skill in the art that the same dielectric layers, meta-structures and others as illustrated in FIGS. 7 to 9 may also be applied to the source resonator 100 of the wireless power transfer 10.

Figure 10:
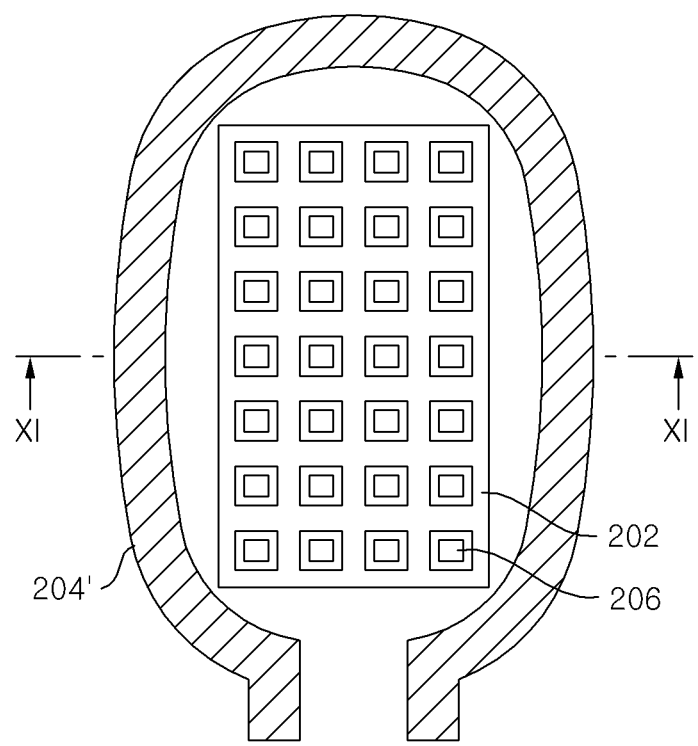
FIG. 10 show a plan view of still another example of a receiver resonator (or a source resonator) applied to a wireless power receiver (or a wireless power transfer) in accordance with an embodiment of the present invention, wherein an antenna is arranged in the exterior of a dielectric layer in a shape of a ring.
Figure 11:
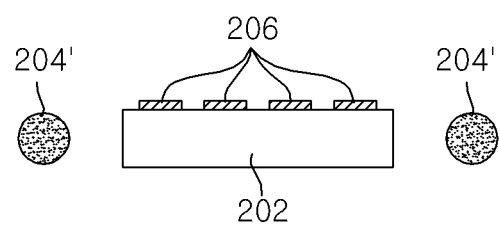
FIG. 11 is a sectional view of the receiver resonator (or the source resonator) shown in FIG. 10 taken along a line XI-XI.

FIG. 10 is a plan view of another example of the receiver resonator 200 applied to the wireless power receiver 20 in accordance with an embodiment of the present invention, and FIG. 11 is a sectional view of the receiver resonator 200 of FIG. 10 taken along a line X-X.

The example of FIG. 10 is illustrated to include an antenna 204' that is arranged in the shape of a ring in the exterior of the dielectric layer 202 while enclosing the dielectric layer 202.

As illustrated in FIGS. 10 and 11, the antenna 204' is arranged in the shape of a ring in the exterior of the dielectric layer 202, and a meta-structure 206 is formed a front surface of the dielectric layer 202 as similar to the example of FIG. 3.

While only the receiver resonator 200 of the wireless power receiver 20 is depicted in FIGS. 10 and 11 for the sake of explanation, it will be readily appreciated to those having an ordinary skill in the art that the same ring-shaped antenna, meta-structure and others as illustrated in FIGS. 10 and 11 may also be applied to the source resonator 100 of the wireless power transfer 10.

Where the antenna 104' is implemented in the shape of a ring, there is no need to secure a space for accommodating an antenna on the dielectric layer 202.

Figure 12:
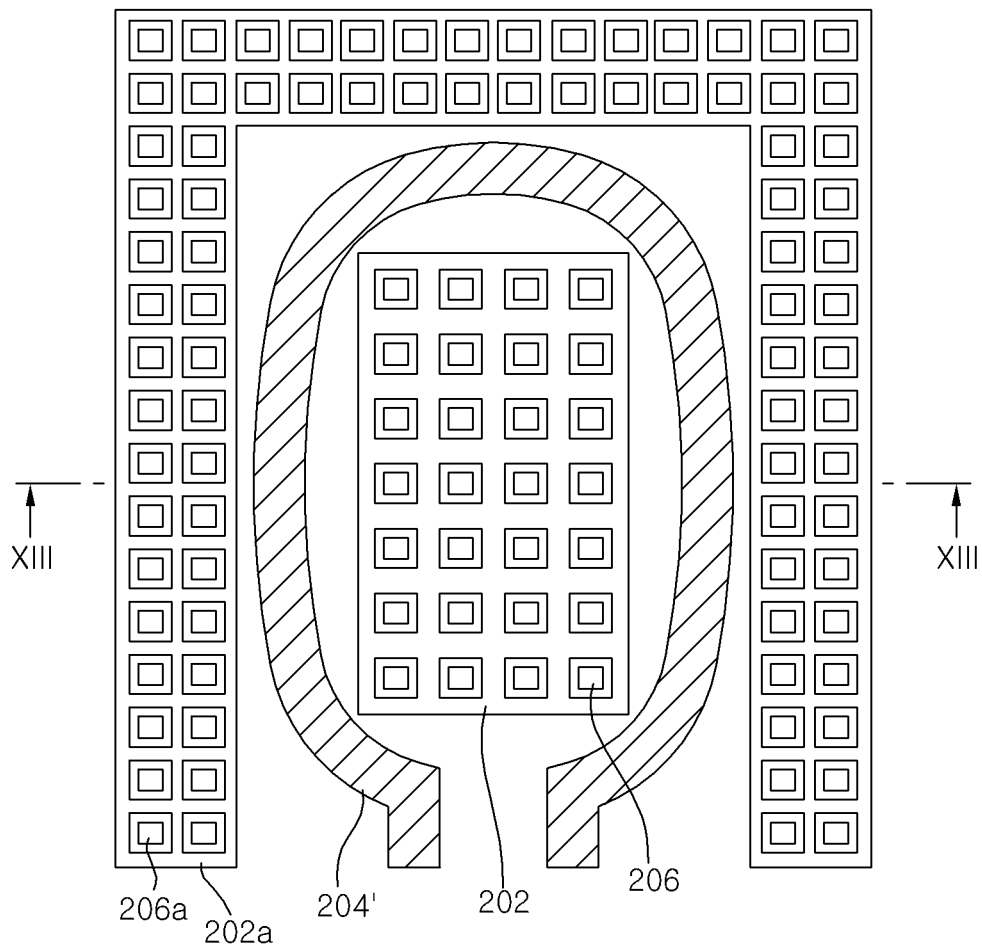
FIG. 12 show a plan view of still further another example of a receiver resonator (or a source resonator) applied to a wireless power receiver (or a wireless power transfer) in accordance with an embodiment of the present invention, wherein an antenna is arranged in the exterior of a first dielectric layer in a shape of a ring and a first and second meta-structures are located on the same plane.
Figure 13:
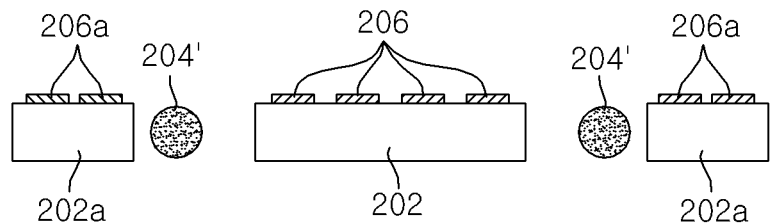
FIG. 13 is a sectional view of the receiver resonator (or the source resonator) shown in FIG. 12 taken along a line XIII-XIII.

FIG. 12 is a plan view of another example of the receiver resonator 200 applied to the wireless power receiver 20 in accordance with an embodiment of the present invention, and FIG. 13 is a sectional view of the receiver resonator 200 of FIG. 12 taken along a line XIII-XIII.

As illustrated in FIGS. 12 and 13, the receiver resonator 200 includes a first planar dielectric layer 202, an antenna 204' arranged in the shape of a ring in the exterior of the first dielectric layer 202 while enclosing the first dielectric layer 202, and a first meta-structure 206 that is arranged on the first dielectric layer 202 and reinforces at least one of the electric fields and magnetic fields that are formed in the receiver resonator 200. The receiver resonator 200 also includes a second planar dielectric layer 202a located in the exterior of the ring-shaped antenna 204' while enclosing the antenna 204', and a second meta-structure 206a that is arranged on the second dielectric layer 202a and reinforces at least one of the electric fields and magnetic fields that are formed in the receiver resonator 200.

In this embodiment, it is characterized in that the first and second meta-structures 206 and 206a are placed on the same plane and the second meta-structure 206a amplifies any one of the electric fields and the magnetic fields that formed in the receiver resonator 200.

While only the receiver resonator 200 of the wireless power receiver 20 is depicted in FIGS. 12 to 13 for the sake of explanation, it will be readily appreciated to those having an ordinary skill in the art that the same dielectric layers, meta-structures and others as illustrated in FIGS. 12 to 13 may also be applied to the source resonator 100 of the wireless power transfer 10.

Figure 14:
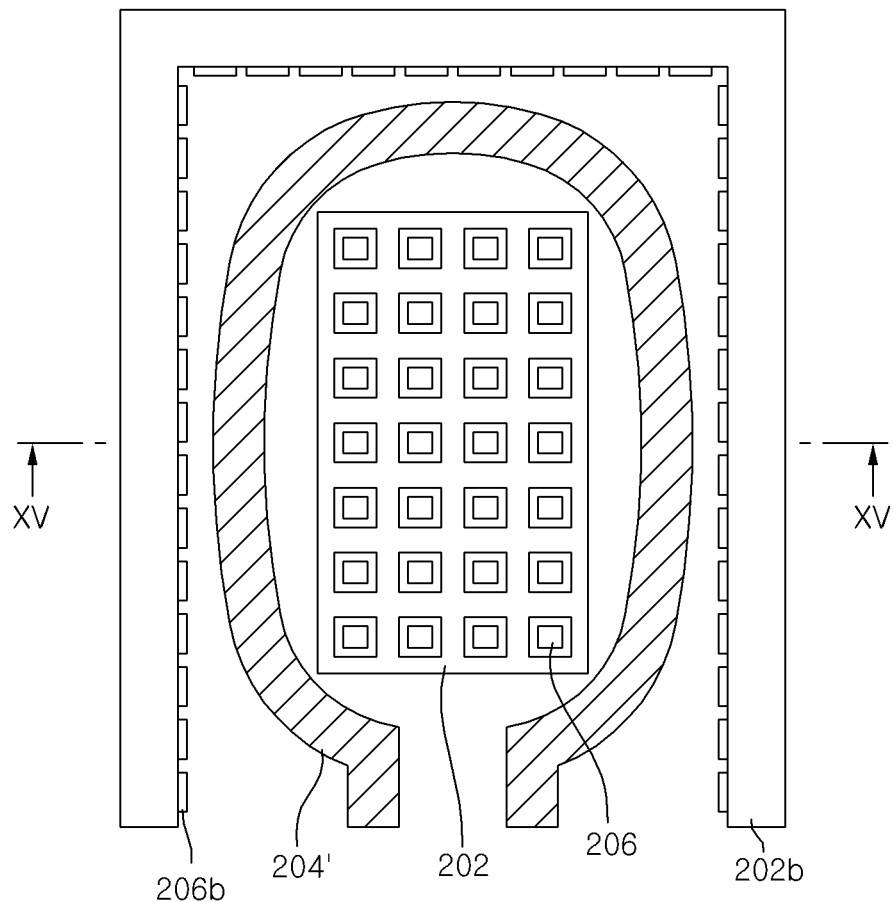
FIG. 14 show a plan view of still further another example of a receiver resonator (or a source resonator) applied to a wireless power receiver (or a wireless power transfer) in accordance with an embodiment of the present invention, wherein an antenna is arranged in the exterior of a first dielectric layer and a first and second meta-structures are perpendicular to each other.
Figure 15:
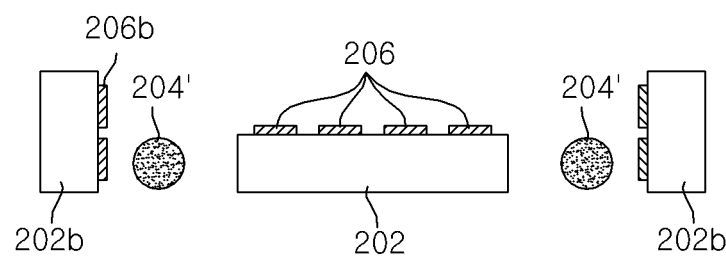
FIG. 15 is a sectional view of the receiver resonator (or the source resonator) shown in FIG. 14 taken along a line XV-XV.
Figure 16:
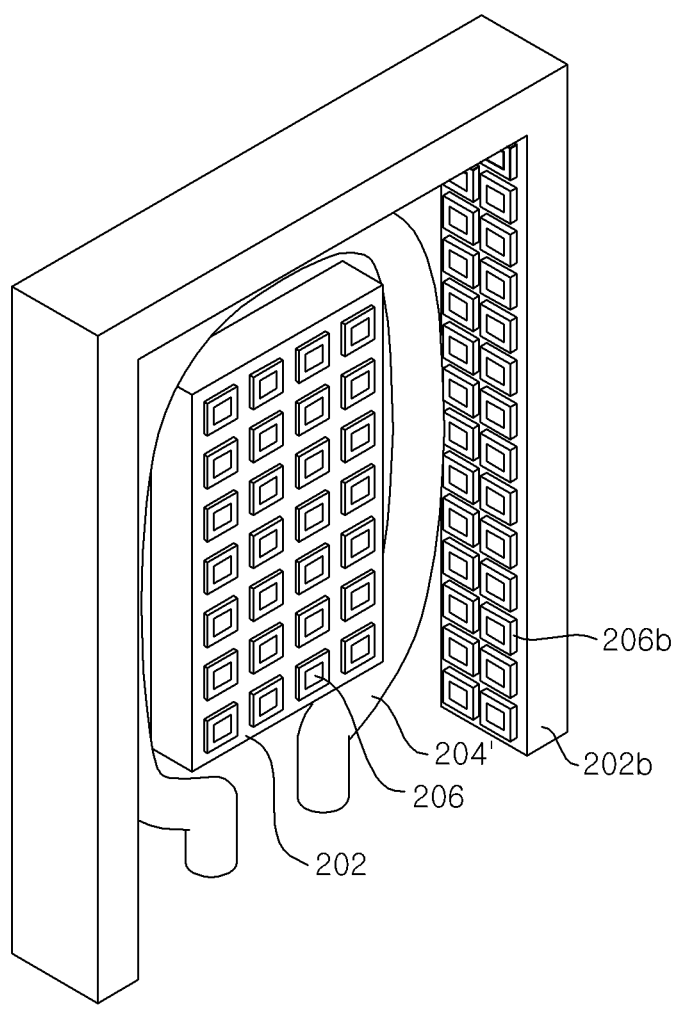
FIG. 16 is a perspective view of the receiver resonator (or the source resonator) shown in FIG. 14.

FIG. 14 is a plan view of another example of the receiver resonator 200 applied to the wireless power receiver 20 in accordance with an embodiment of the present invention; and FIG. 15 is a sectional view of the receiver resonator 200 of FIG. 14 taken along a line XV-XV; and FIG. 16 is a perspective view of the receiver resonator 200 of FIG. 14.

As illustrated in FIGS. 14 to 16, the receiver resonator 200 includes a first planar dielectric layer 202, an antenna 204' arranged in the shape of a ring in the exterior of the first dielectric layer 202 while enclosing the first dielectric layer 202, and a first meta-structure 206 that is arranged on the first dielectric layer 202 and reinforces at least one of the electric fields and magnetic fields that are formed in the receiver resonator 200. The receiver resonator 200 also includes a second planar dielectric layer 202b arranged perpendicularly in the exterior of the ring-shaped antenna 204' while enclosing the antenna 204' and a second meta-structure 206b that is arranged on the second dielectric layer 202b and reinforces at least one of the electric fields and magnetic fields that are formed in the receiver resonator 200.

In this embodiment, it is characterized in that the first and second meta-structures 206 and 206b are perpendicular to each other and the second meta-structure 206b focuses any one of the electric fields and the magnetic fields that formed in the receiver resonator 200.

While only the receiver resonator 200 of the wireless power receiver 20 is depicted in FIGS. 14 to 16 for the sake of explanation, it will be readily appreciated to those having an ordinary skill in the art that the same dielectric layers, meta-structures and others as illustrated in FIGS. 14 to 16 may also be applied to the source resonator 100 of the wireless power transfer 10.

FIG. 17 illustrates an overall configuration diagram of a wireless power transceiver mobile device in accordance with an embodiment of the present invention. The wireless power transceiver mobile device includes a transceiver resonator 300, a power supply 308, a transfer circuit unit 310, a receiver circuit unit 312, a battery unit 314, a switch unit 316, and a control unit 318.

The wireless power transceiver mobile device may be implemented by providing combined functions to transfer and receive the wireless power to a mobile device such as a smart-phone and selectively switching one of these functions.

As shown in FIG. 17, the wireless power transceiver resonator 300 is coupled to a power supply or a resonator of an external mobile device (not shown) to transfer and receive the power to and from the external mobile device. The transceiver resonator 300 includes a planar dielectric layer 302, a loop-shaped antenna 304 patterned on the planar dielectric layer 302, a meta-structure 306 that is arranged within the antenna 304 and reinforces any one of the electric fields and the magnetic fields that are formed in the transceiver resonator 300.

The meta-structure 306, which is applied to the embodiment of the present invention, is physically separated from the antenna 304, and may include one or more meta-pattern layers patterned on the dielectric layer 302, e.g., an array of unit cells with a DHMR structure. Further, it is characterized in that the meta-structure 106 has a Q factor of 100.

This meta-structure 306 has an effective dielectric constant $\in$ of a positive value and an effective permeability $\mu$ of a negative value, and in this condition, it is characterized in that the frequency band absorbed by the meta-structure 306 is different from the resonant frequency.

Additionally and alternatively, the meta-structure 306 has both an effective dielectric constant $\in$ and an effective permeability $\mu$ that are a negative value, and in this condition, it is characterized in that a dipole structure of meta-materials (not shown) corresponding to the unit cells are formed on the rear surface of the planar dielectric layer 302.

The power supply 308 serves to feed an electrical power to the wireless power transceiver mobile device.

The transfer circuit unit 310 may include a VCO (Voltage Controlled Oscillator) that changes a DC controlled voltage from the power supply 308 to control an output oscillation frequency and an amplifier that amplifies an AC signal controlled through the use of the VCO.

The amplifier includes, for example, an adaptive bias circuit, which in turn receives information on a charge state from the transceiver resonator 300 to stop charging the power.

The receiver circuit unit 312 may include a rectifier that rectifies the power received through the transceiver resonator 300 and a DC-DC converter that converts an input of a rectified DC voltage from the rectifier into an output of a DC voltage.

The battery unit 314 serves to charge a power converted through the DC-DC converter.

The switch unit 316 is configured to switch the transceiver resonator 300 between the transfer circuit unit 310 and the receiver circuit unit 312 under a control of the control unit 318.

More specifically, in a transfer mode of the wireless power transceiver mobile device, the switch unit 316 is switched into the transfer circuit unit 310 to allow the wireless power transceiver mobile device to wirelessly transfer the power. In a receiving mode of the wireless power transceiver mobile device, the switch unit 316 is switched into the receiver circuit unit 312 to allow the wireless power transceiver mobile device to wirelessly receive the power. It is understood that such switching modes may be made by the operation of a user interface implemented on the wireless power transceiver mobile device or may be automatically toggled with a signal to transfer or receive the power to the wireless power transceiver mobile device.

The control unit 318 plays a role to control the switching operation of the switch unit 316.

Further, the control unit 318 receives the charge state information from the receiver circuit unit 312 to stop charging the power. In other words, the control unit 318 monitors the charge state of the receiver circuit unit 312 and blocks the charging of the power in accordance with the charge state information.

As set forth above, in accordance with an embodiment of the present invention, the meta-structure is applied to the wireless power transceiver technique. Consequently, it allows the improvement of the Q factor of the wireless power transceiver, which results in reinforcing the electric fields or magnetic fields. Further, it secures the wireless power transfer efficiency of at least 80% in a 13.56 MHz frequency band used for the NFC and allows a size reduction of the wireless power transceiver mobile device.

While the invention has been shown and described with respect to the embodiments, the present invention is not limited thereto. It will be understood by those skilled in the art that various changes and modifications may be made without departing from the scope of the invention as defined in the following claims.

What is claimed is:

1. A wireless power receiver comprising:
a receiver resonator configured to be coupled to a source resonator to receive a power from the source resonator, the receiver resonator comprising:
a planar dielectric layer;
an antenna patterned in a form of a loop on the dielectric layer or arranged in a shape of a ring in an exterior of the dielectric layer; and
a meta-structure separated from the antenna and arranged on the dielectric layer, the meta-structure being arranged within the antenna, wherein the meta-structure has an effective dielectric constant of a positive value and an effective permeability of a negative value, so that a frequency band absorbed by the meta-structure becomes different from a resonant frequency.

2. The wireless power receiver of claim 1, wherein the meta-structure includes at least one meta-pattern layer.

3. The wireless power receiver of claim 1, wherein the meta-structure has a Q factor of 100.

4. A wireless power receiver comprising:
a receiver resonator configured to be coupled to a source resonator to receive a power from the source resonator, the receiver resonator comprising:
a first planar dielectric layer;
an antenna patterned in a form of a loop on the first dielectric layer or arranged in a shape of a ring in an exterior of the first dielectric layer;
a first meta-structure arranged on the first dielectric layer, the first meta-structure being arranged within the antenna;
a second planar dielectric layer located in the exterior of the first dielectric layer; and a second meta-structure arranged on the second dielectric layer and configured to reinforce at least one of the electric fields and magnetic fields that are formed in the receiver resonator, wherein the first meta-structure has an effective dielectric constant of a positive value and an effective permeability of a negative value, so that a frequency band absorbed by the first meta-structure becomes different from a resonant frequency.

5. The wireless power receiver of claim 4, wherein the second meta-structure and the first meta-structure are arranged on an identical plane.

6. The wireless power receiver of claim 5, wherein the second meta-structure is configured to amplify any one of the electric fields and the magnetic fields that are formed in the receiver resonator.

7. The wireless power receiver of claim 4, wherein the second meta-structure is perpendicular to the first meta-structure.

8. The wireless power receiver of claim 7, wherein the second meta-structure is configured to focus any one of the electric fields and the magnetic fields that are formed in the receiver resonator.

9. A wireless power transfer device comprising:
a source resonator configured to be coupled to a power supply, the source resonator comprising:
a planar dielectric layer;
an antenna configured patterned in a form of a loop on the dielectric layer; and
a meta-structure arranged within the antenna, wherein the meta-structure has an effective dielectric constant of a positive value and an effective permeability of a negative value, so that a frequency band absorbed by the meta-structure becomes different from a resonant frequency.

10. A wireless power transceiver device comprising:
a resonator configured to be coupled to a power supply or a resonator of an external device to transfer to and receive from the external device, the resonator comprising:
a planar dielectric layer;
an antenna patterned in a form of a loop on the dielectric layer; and
a meta-structure arranged within the antenna, wherein the meta-structure has an effective dielectric constant of a positive value and an effective permeability of a negative value, so that a frequency band absorbed by the meta-structure is different from a resonant frequency.

11. The wireless power transceiver device of claim 10, wherein the meta-structure is physically separated from the antenna and is patterned on the dielectric layer.

12. The wireless power transceiver device of claim 10, wherein the meta-structure comprises one or more meta-pattern layers.

13. The wireless power transceiver device of claim 10, wherein the meta-structure has a Q factor of 100.

* * * * *